United States Patent
Kalliokulju et al.

(10) Patent No.: US 7,016,678 B1
(45) Date of Patent: Mar. 21, 2006

(54) METHOD AND ARRANGEMENT FOR AVOIDING LOSS OF ERROR-CRITICAL NON REAL TIME DATA DURING CERTAIN HANDOVERS

(75) Inventors: Juha Kalliokulju, Vesilahti (FI); Matti Turunen, Tampere (FI); Jan Suumäki, Tampere (FI)

(73) Assignee: Nokia Mobile Phones, Ltd., Espoo (FI)

( * ) Notice: Subject to any disclaimer, the term of this patent is extended or adjusted under 35 U.S.C. 154(b) by 664 days.

(21) Appl. No.: 09/443,262

(22) Filed: Nov. 22, 1999

(30) Foreign Application Priority Data

Nov. 23, 1998 (FI) .................................. 982531 U

(51) Int. Cl.
  *H04Q 7/20* (2006.01)
(52) U.S. Cl. ...................... 455/436; 455/525; 370/331
(58) Field of Classification Search ................ 455/436, 455/437, 443, 525; 370/331, 332, 469, 465
  See application file for complete search history.

(56) References Cited

U.S. PATENT DOCUMENTS

| | | | |
|---|---|---|---|
| 4,654,867 A * | 3/1987 | Labedz et al. .............. 455/438 |
| 5,513,380 A * | 4/1996 | Ivanov et al. | |
| 5,530,693 A | 6/1996 | Averbuch et al. ............. 370/60 |
| 5,561,844 A * | 10/1996 | Jayapalan et al. .......... 455/442 |
| 5,809,422 A * | 9/1998 | Raleigh et al. | |
| 5,943,333 A * | 8/1999 | Whinnett et al. ........... 370/341 |
| 6,052,385 A * | 4/2000 | Kanerva et al. | |
| 6,073,032 A * | 6/2000 | Keskitalo et al. | |
| 6,094,424 A * | 7/2000 | Kalmanek et al. | |
| 6,108,539 A * | 8/2000 | Ray et al. ................... 455/430 |
| 6,122,293 A * | 9/2000 | Frodigh et al. | |
| 6,192,039 B1 * | 2/2001 | Nishio et al. | |
| 6,307,867 B1 * | 10/2001 | Roobol et al. | |

FOREIGN PATENT DOCUMENTS

WO    WO 98/53576    11/1998

OTHER PUBLICATIONS

"Handover In A High-Speed Wireless ATM Based Lan", Meulenhof et al., IEEE 1999, Eindhoven University Of Technology, no month listed.
ETSI 301344, "Digital Cellular Telecommunication System, (Phase 2+), General Packet Radio Service (GPRS)", Service Description Stage 2, GSM 03.60, Version 6.3.2., 1997, p. 72, no month listed.

* cited by examiner

*Primary Examiner*—Charles N Appiah
*Assistant Examiner*—Nghi H. Ly
(74) *Attorney, Agent, or Firm*—Perman & Green, LLP

(57) ABSTRACT

A method is disclosed for a mobile station for performing a handover from a first network connection to a second network connection. A mobile telecommunication system provides for non-real time telecommunication connections over a radio interface between mobile stations and the fixed parts of the mobile telecommunication system. At least one active non-real time telecommunication connection is between a mobile station and the fixed parts of the mobile telecommunication system is suspended (704) before performing a handover (702') from the first network connection to the second network connection. After the new connection has been established the suspended non-real time telecommunication connection are resumed (705).

23 Claims, 7 Drawing Sheets

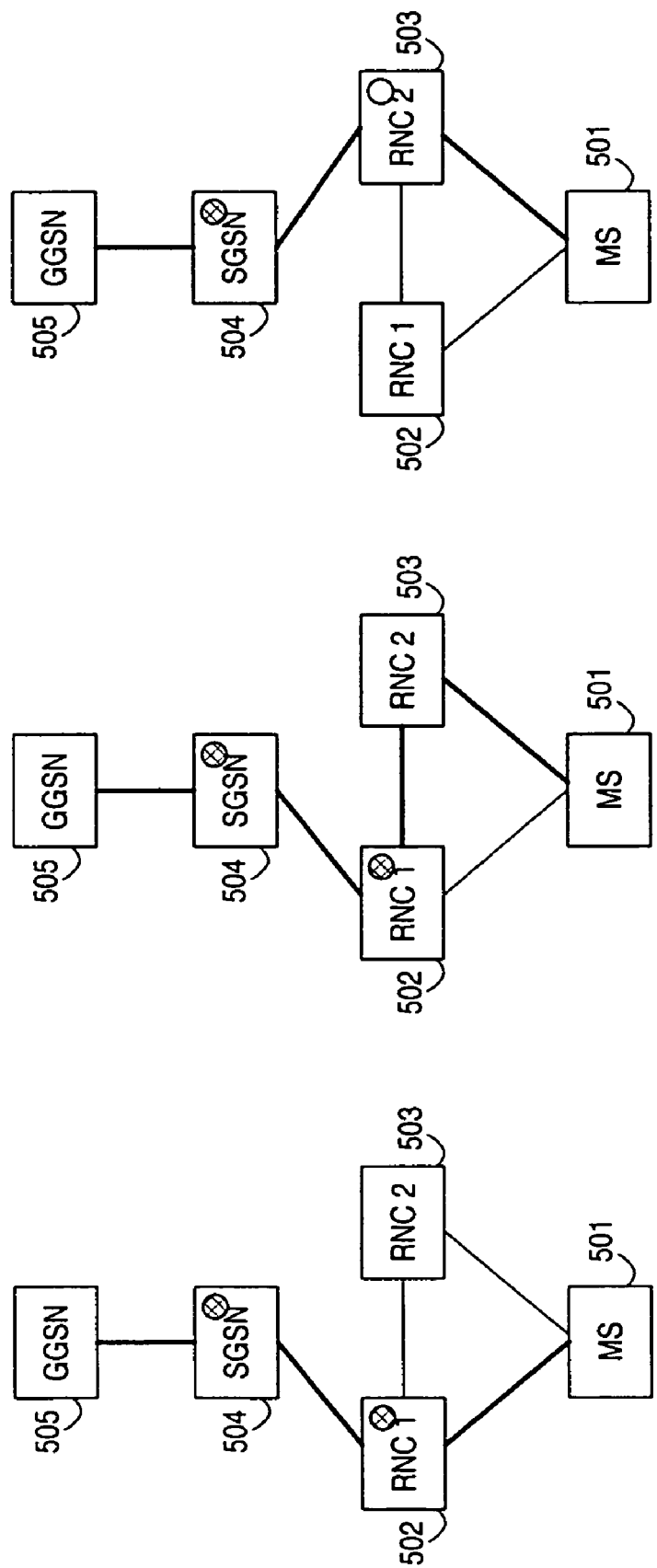

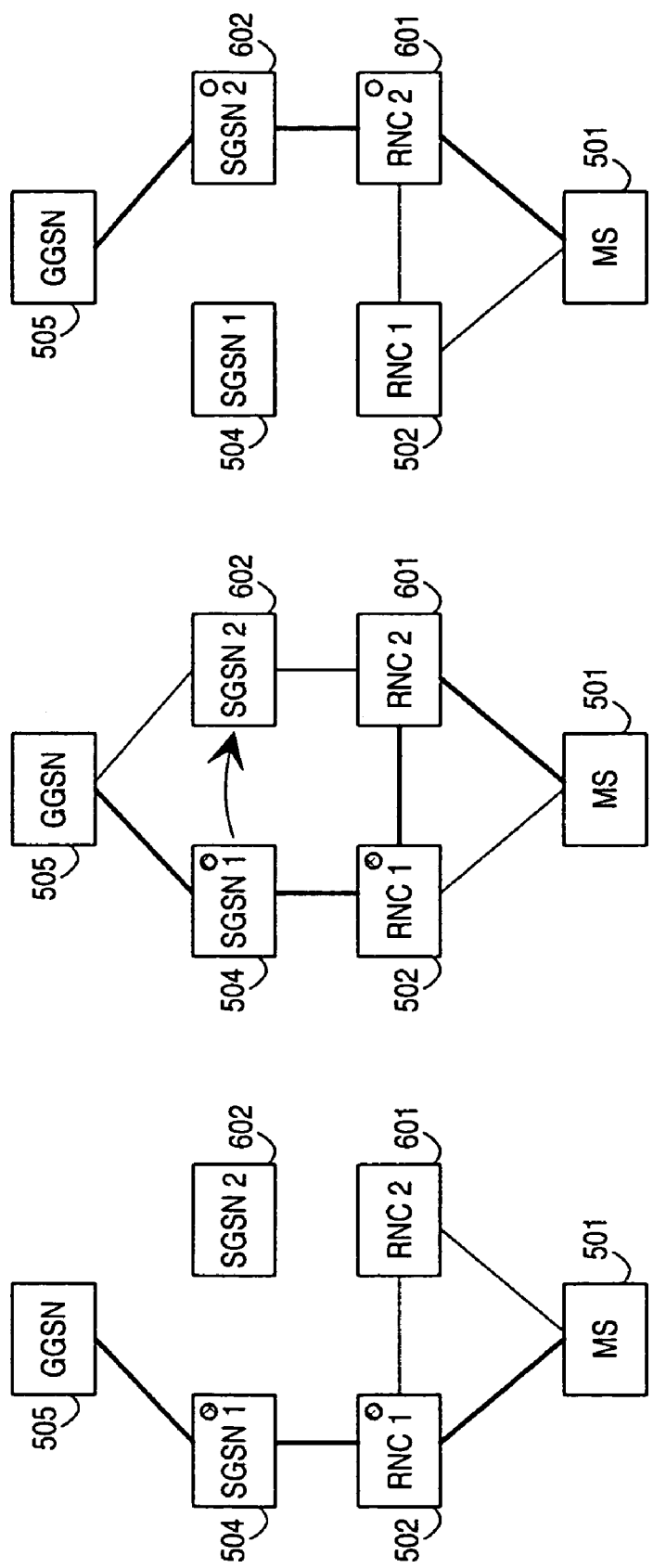

METHOD AND ARRANGEMENT FOR AVOIDING LOSS OF ERROR-CRITICAL NON REAL TIME DATA DURING CERTAIN HANDOVERS

TECHNOLOGICAL FIELD

The invention concerns generally the protocol structures that are used to arrange the communication between a mobile terminal and a packet-switched network. Especially the invention concerns the optimal composition of such structures from the point of view of minimized risk of losing certain types of data in certain handover situations on one hand and reduced complexity on the other.

BACKGROUND OF THE INVENTION

FIG. 1 illustrates the known data protocol stacks that are applied in a packet-switched communication connection where one end is a Mobile Station (MS) and the communication takes place over a GPRS network (General Packet Radio Service) through a Base Station Subsystem (BSS), a Serving GPRS Support Node (SGSN) and a Gateway GPRS Support Node (GGSN). The protocol layers where the peer entities are in the MS and the BSS are the physical layer 101 that employs the GSM cellular radio system (Global System for Mobile telecommunications), the Media Access Control (MAC) layer 102 and the Radio Link Control layer 103 which sometimes is regarded as only a part of the MAC layer 102—hence the dashed line between them. The protocol layers where the peer entities are in the BSS and the SGSN are the L1bis layer 104, the Network Service layer 105 and the BSS GPRS Protocol (BSSGP) layer 106.

The layers for which the peer entities are in the MS and the SGSN are the Logical Link Control (LLC) layer 107 and the SubNetwork Dependent Convergence Protocol (SNDCP) layer 108. It should be noted that only data or user plane protocols are shown in FIG. 1; a complete illustration of protocols would include the Layer 3 Mobility Management (L3MM) and Short Message Services (SMS) blocks on top of the LLC layer 107 in parallel with the SNDCP layer 108. Additionally there are the known Session Management (SM) and Radio Resource management (RR) entities that are not located on top of the LLC layer. At the interface between the SGSN and the GGSN there are the Layer 1 (L1) layer 109, the Layer 2 (L2) layer 110, a first Internet Protocol (IP) layer 111, the User Datagram Protocol/Transport Control Protocol (UDP/TCP) layer 112 and the GPRS Tunneling Protocol (GTP) layer 113. Between the MS and the GGSN there are the X.25 layer 114 and a second Internet Protocol layer 115. An application layer 116 in the MS will communicate with a peer entity that is located for example in another MS or some other terminal.

Proposals for the future UMTS (Universal Mobile Telecommunication System) have suggested similar protocol structures for the communication between mobile stations, Radio Network Controllers (RNCs) and service nodes of packet-switched networks, with small changes or modifications in the designations of the devices, layers and protocols. It is typical to protocol structures like that in FIG. 1 that each layer has an exactly determined set of tasks to perform and an exactly determined interface with the next upper layer and the next lower layer. A certain amount of memory and processing power must be allocated in the devices taking part in the communication to maintain the layered structure and accomplish the tasks of each layer. It is therefore easily understood that the more complicated the structure of layered protocols, the more complicated the required software and hardware implementation. Complexity is disadvantageous in terms of costs incurred in design and manufacture and it increases the possibility of design errors. Additionally, in battery-driven mobile terminals it is a continual aim to reduce power consumption and diminish physical size, whereby a more simplified structure of protocol layers would create advantage.

SUMMARY OF THE INVENTION

It is therefore an object of the present invention to provide a method and arrangement that would accomplish the tasks of known communication protocol arrangements but with a simpler protocol structure.

The objects of the invention are accomplished by replacing certain parts of the protocol structure by a temporary suspension of certain communications for the duration of a handover.

The method according to the invention is characterised by that it comprises the steps of
- suspending at least one active non-real time telecommunication connection between a mobile station and the fixed parts of a mobile telecommunication system,
- performing a handover from a first network connection to a second network connection and
- resuming the suspended non-real time telecommunication connection.

The invention also concerns a mobile station arranged to perform a handover according to the above-described method.

The invention relates closely to the observation that the role of certain layers in many protocol structures is of minor practical value and is limited to certain measures for avoiding loss of data during a handover. If the data concerned allows for some additional delays to be caused on its path from the transmitting device to the receiving device, such protocol layers may be omitted altogether by simply suspending the transmission of data when a handover is about to take place and resuming normal operation after the handover has been successfully completed.

In the GPRS example presented in the description of prior art the protocol layer that can be omitted by employing the suspension-resumption mechanism is the LLC layer. We may note that the RLC layer is capable of performing all required error correction tasks over the radio interface in normal operation and the role of LLC has mainly been related to handovers between different BSCs (Base Station Controllers), where error-critical (but not delay-critical) data has needed a mechanism for avoiding loss of data. In the proposed UMTS a similar need has existed in handovers between different RNCs or SGSNs (often designated as 3GSGSNs or 3rd Generation SGSNs). If we remove this need by temporarily suspending the transmission of such error-critical data altogether for the duration of that time interval where loss of data could otherwise occur, the error-correcting functions of the LLC layer become superfluous.

The LLC layer has also had certain responsibilities for flow control. According to the invention the RLC layer may take care of all flow control between the mobile station and a base station controller or a radio network controller (or generally the radio access network), and local flow control mechanisms may be employed for controlling the flow over the interface between the radio access network and a core network. In UMTS the latter is known as the Iu interface.

BRIEF DESCRIPTION OF DRAWINGS

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

FIGS. 5a to 5c illustrate an inter-RNC, intra-SGSN handover according to the invention, FIGS. 6a to 6c illustrate an inter-RNC, inter-SGSN handover according to the invention

DETAILED DESCRIPTION OF THE INVENTION

Figure 1:
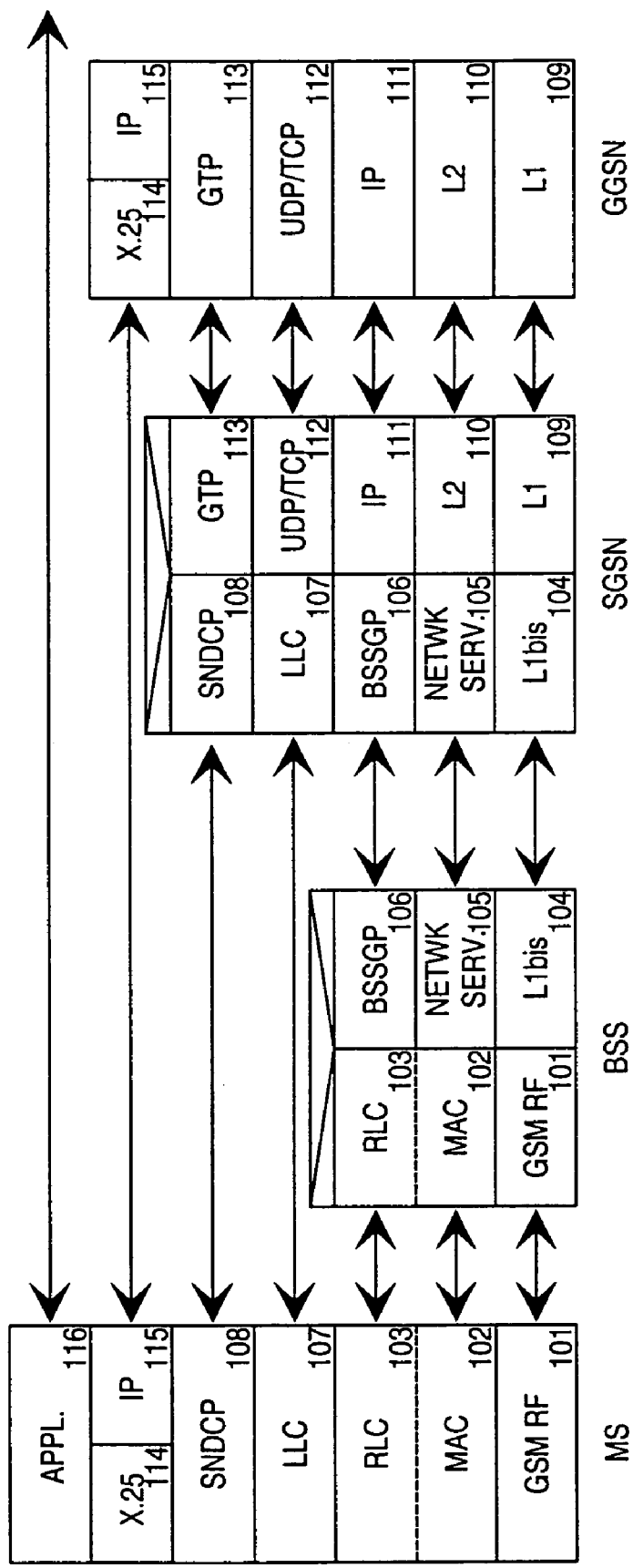
FIG. 1 illustrates the known protocol stacks in a GPRS implementation.

We will illustrate the applicability of the invention in connection with the known GPRS system. However, the presented examplary embodiments do not limit the applicability of the invention to any specific system. As a background to the invention we will first consider some known characteristics of the GPRS system.

The general packet radio service (GPRS) is a new service to the GSM system, and is one of the objects of the standardization work of the GSM phase 2+ at the ETSI (European Telecommunications Standards Institute). The GPRS operational environment comprises one or more subnetwork service areas, which are inter-connected by a GPRS backbone network. A subnetwork comprises a number of packet data service nodes (SN), which in this application will be referred to as serving GPRS support nodes (SGSN), each of which is connected to the mobile telecommunications system in such a way that it can provide a packet service for mobile data terminals via several base stations, i.e. cells. The intermediate mobile communication network provides packet-switched data transmission between a support node and mobile data terminals. Different subnetworks are in turn connected to an external data network, e.g. to a public switched data network (PSDN), via GPRS gateway support nodes (GGSN). The GPRS service thus allows to provide packet data transmission between mobile data terminals and external data networks when the appropriate parts of a mobile telecommunications system function as an access network.

In order to access the GPRS services, a MS shall first make its presence known to the network by performing a GPRS attach. This operation makes the MS available for SMS (Short Message Services) over GPRS, paging via SGSN, and notification of incoming GPRS data. More particularly, when the MS attaches to the GPRS network, i.e. in a GPRS attach procedure, the SGSN creates a mobility management context (MM context). Also the authentication of the user is carried out by the SGSN in the GPRS attach procedure. In order to send and receive GPRS data, the MS shall activate the packet data address that it wants to use, by requesting a PDP context activation procedure, where PDP comes from Packet Data Protocol. This operation makes the MS known in the corresponding GGSN, and interworking with external data networks can commence. More particularly a PDP context is created in the MS and the GGSN and the SGSN. The PDP context defines different data transmission parameters, such as the PDP type (e.g. X.25 or IP), PDP address (e.g. X.121 address), quality of service (QoS) and NSAPI (Network Service Access Point Identifier). The MS activates the PDP context with a specific message, Activate PDP Context Request, in which it gives information on the TLLI, PDP type, PDP address, required QoS and NSAPI, and optionally the access point name (APN).

The quality of service defines how the packet data units (PDUs) are handled during the transmission through the GPRS network. For example, the quality of service levels defined for the PDP addresses control the order of transmission, buffering (the PDU queues) and discarding of the PDUs in the SGSN and the GGSN, especially in a congestion situation. Therefore, different quality of service levels will present different end-to-end delays, bit rates and numbers of lost PDUs, for example, for the end users.

Currently the GPRS allows for only one QoS for each PDP context. Typically a terminal has only one IP address, so conventionally it may request for only one PDP context. There is recognised the need for modifying the existing systems so that a PDP context could accommodate several different QoS flows. For example, some flows may be associated with E-mail that can tolerate lengthy response times. Other applications cannot tolerate delay and demand a very high level of throughput, interactive applications being one example. These different requirements are reflected in the QoS. Intolerance to delay must usually be associated with a relatively good tolerance for errors; correspondingly a very error-critical application must allow for long delays, because it is impossible to predict how many retransmission attempts it will take to achieve the required high level of correctness. If a QoS requirement is beyond the capabilities of a PLMN, the PLMN negotiates the QoS as close as possible to the requested QoS. The MS either accepts the negotiated QoS, or deactivates the PDP context.

Current GPRS QoS profile contains five parameters: service precedence, delay class, reliability, and mean and peak bit rates. Service precedence defines some kind of priority for the packets belonging to a certain PDP context. Delay class defines mean and maximum delays for the transfer of each data packet belonging to that context. Reliability in turn specifies whether acknowledged or unacknowledged services will be used at LLC (Logical Link Control) and RLC (Radio Link Control) layers. In addition, it specifies whether protected mode should be used in case of unacknowledged service, and whether the GPRS backbone should use TCP or UDP to transfer data packets belonging to the PDP context. Furthermore, these varying QoS parameters are mapped to four QoS levels available at the LLC layer.

Figure 2:
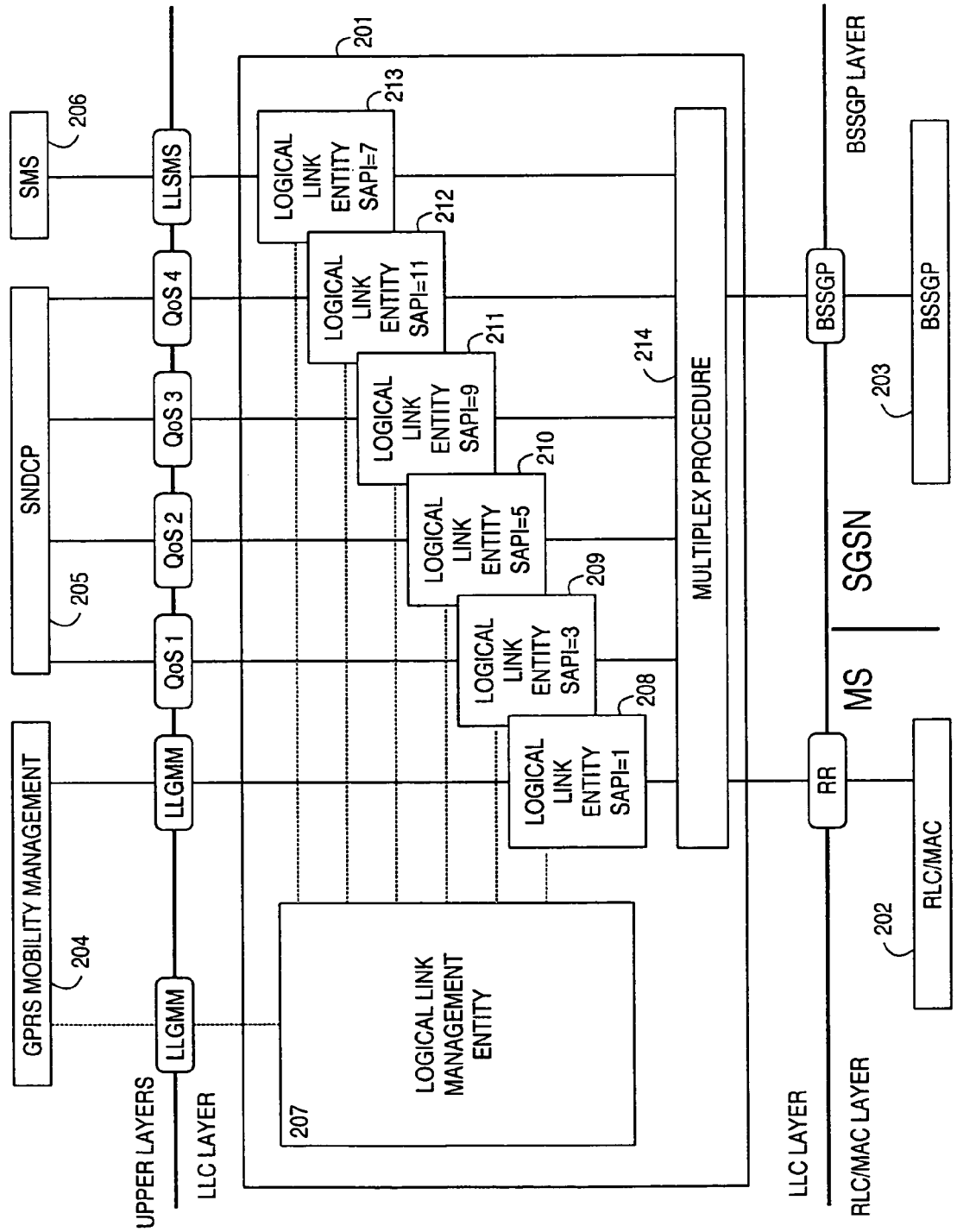
FIG. 2 illustrates the known functional model of an LLC layer.

FIG. 2 is a functional model of a known LLC protocol layer 201, corresponding to the blocks 107 in FIG. 1. Block 202 represents the known lower layer (RLC/MAC; Radio Link Control/Media Access Control) functions that are located below the LLC layer 201 in the protocol stack of a mobile station MS. Correspondingly block 203 represents the known lower layer (BSSGP) functions that are located below the LLC layer 201 in a serving GPRS support node SGSN. The interface between the LLC layer 201 and the RLC/MAC layers 202 is called the RR interface and the interface between the LLC layer 201 and the BSSGP layers 203 is called the BSSGP interface.

Above the LLC layer there are the known GPRS Mobility Management functions 204 (also known as the Layer 3 Mobility Management functions or L3MM), SNDCP functions 205 and Short Messages Services functions 206. Each one of these blocks has one or more interfaces with the LLC layer 201, connecting to its different parts. The Logical Link Management Entity 207 has an LLGMM control interface (Logical Link—GPRS Mobility Management) with block 204. Mobility management data is routed through a LLGMM data interface between block 204 and the first Logical Link Entity 208 of the LLC layer. The second 209, third 210, fourth 211 and fifth 212 Logical Link Entities connect to block 205 through the corresponding interfaces; according to the QoS levels handled by each of the Logical Link Entities the interfaces are known as QoS 1, QoS 2, QoS 3 and QoS 4. The sixth Logical Link Entity 213 of the LLC layer connects to block 206 via an LLSMS interface (Logical Link—Short Messages Services). The Service Access Point Identifiers or SAPIs of the first 208, second 209, third 210, fourth 211, fifth 212 and sixth 213 Logical Link Entities are respectively 1, 3, 5, 9, 11 and 7. Each one of them is connected inside the LLC layer to a multiplexing block 214, which handles the connections through the RR interface to block 202 and further towards the mobile station as well as the connections through the BSSGP interface to block 203 and further towards the SGSN. The connection between the multiplexing block 214 and the lower layer block 202 in the direction of the MS may be described as a "transmission pipe".

Figure 3:
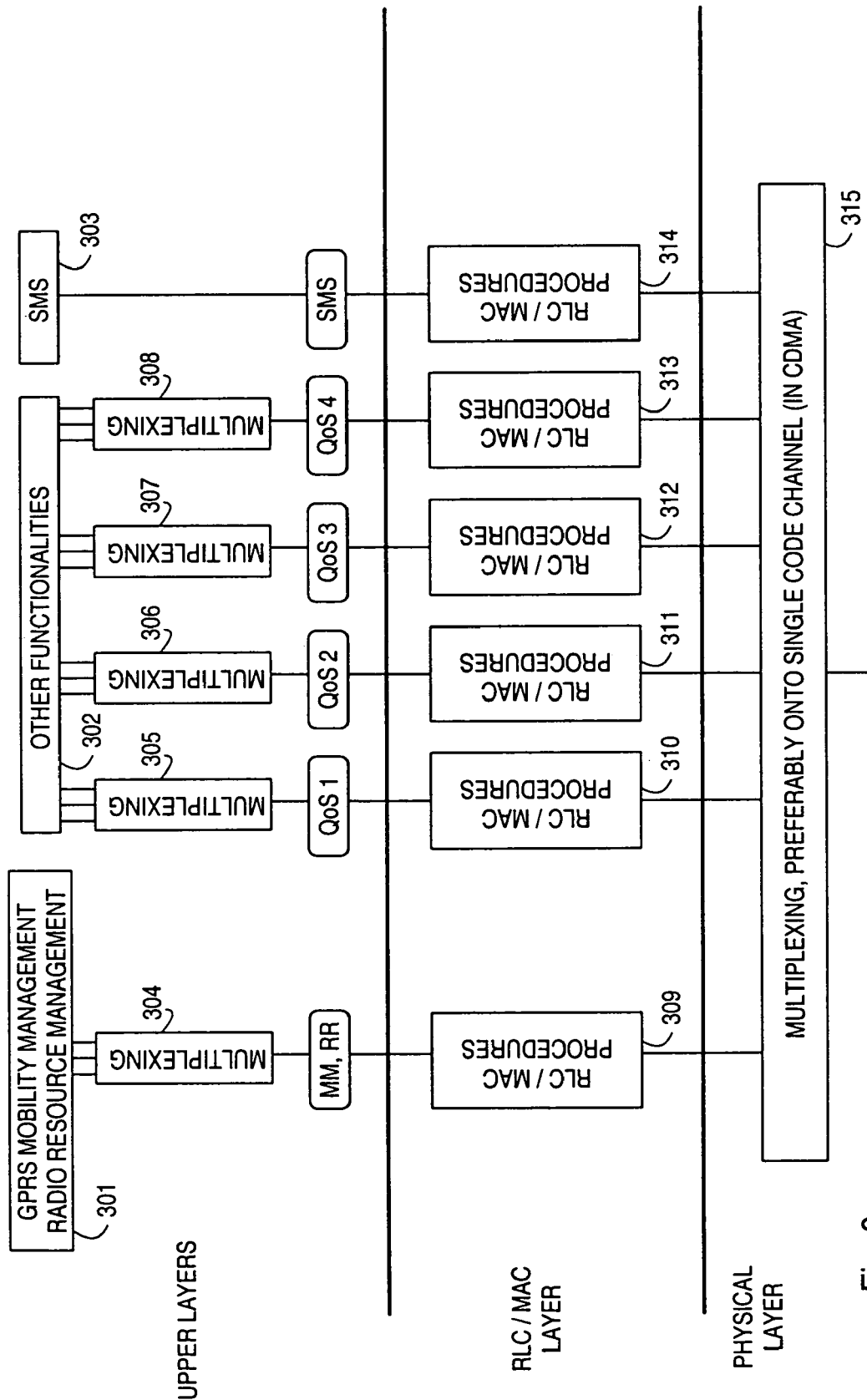
FIG. 3 illustrates a functional model that would replace the LLC layer according to the invention.

FIG. 3 illustrates an arrangement according to the invention where the LLC layer has been completely omitted. The upper layers comprise a MM/RR part 301 for known mobility and radio resource management, an SMS part 303 for processing data related to short messages, as well as a part 302' for processing the received data and data to be transmitted according to other functionalities. "Local" multiplexing/-demultiplexing is performed at the upper layers in blocks 304 to 308 so that there is only one transmission pipe for control information between the MM/R part 301 and the lower layers, one transmission pipe for SMS-related information between the SMS part 303 and the lower layers, and one transmission pipe for each quality of service class between the other functionalities part 302 and the lower layers. Multiplexing is shown in FIG. 3 as taking place in separate functional blocks; however, it may be an inherent part of for example one or several functionalities in the other functionalities part 302.

The RLC/MAC layer is located directly under the upper layers in FIG. 3. It performs the known RLC/MAC functions for each flow of information for which there is a connection between it and the upper layers. The MAC functions consist of procedures for sharing the common radio channels between mobile stations as well as allocations and disallocations of dedicated radio channels. The RLC functions comprise the composing and decomposing of RLC blocks, detecting corrupted RLC blocks and arranging for the retransmission of corrupted blocks when appropriate. In UMTS the the concept of an RLC unit is unidirectional and reserved for one information flow only, so the widely interpreted RLC layer in the protocol structure will accommodate a pair of RLC units for each active flow of information. The multiplexing and demultplexing of the RLC blocks belonging to different flows of information takes place on the physical layer, which is represented by block 315 in FIG. 3. In a spread spectrum system it is advantageous to multiplex all flows of information related to a certain mobile terminal onto a single code channel. From the published standardisation work of the UMTS there is known a physical layer that is applicable to perform the operations represented by block 315.

FIG. 3 as such is only applicable to the mobile station, because there is an RLC/MAC layer under the higher-order layers. However, it is easy to generalise the arrangement of FIG. 3 so that there may be a BSSGP layer under the higher-order layers, resulting in an arrangement applicable to a SGSN. Also in that case there must be an additional stage of multiplexing/demultiplexing at the physical level, like block 315 in FIG. 3.

Figure 4:
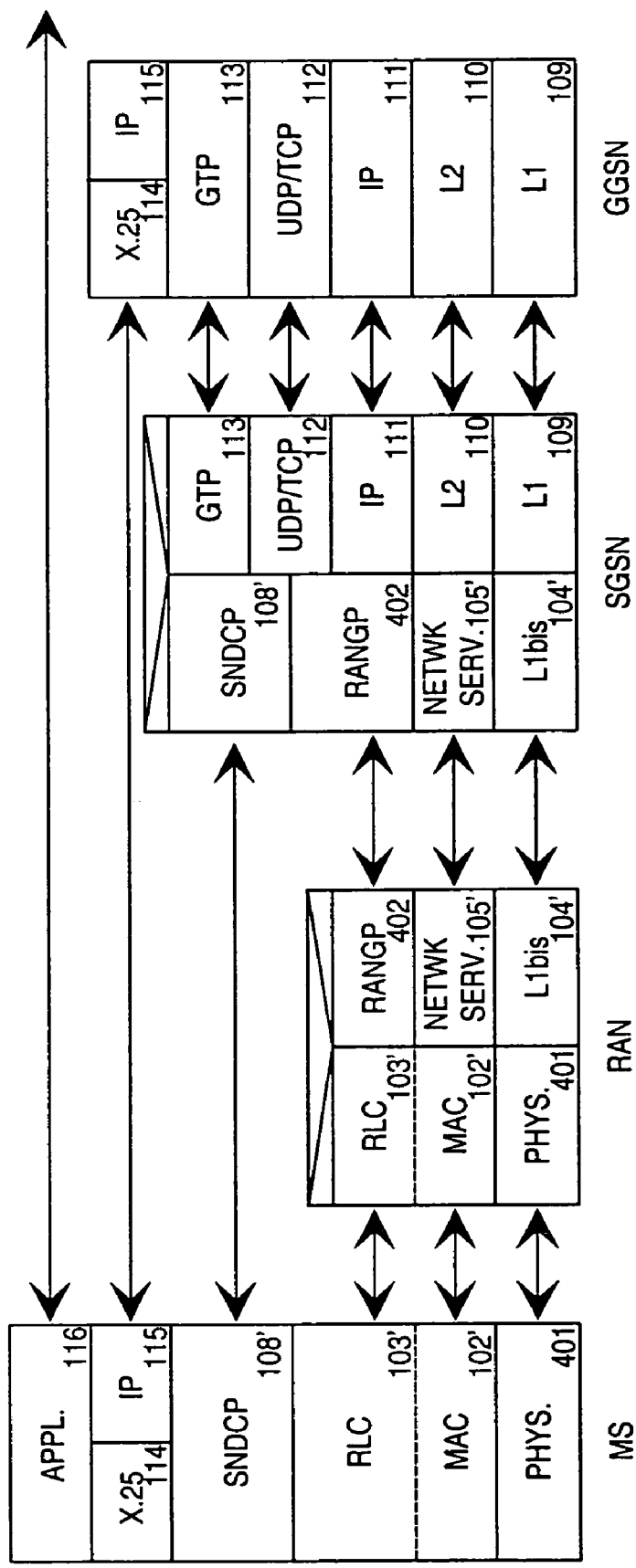
FIG. 4 illustrates an arrangement of protocol stacks according to the invention.

FIG. 4 illustrates the inventive structure of protocol stacks which is comparable to the known arrangement of FIG. 1. It is noted that there is no LLC layers in the mobile station or the SGSN, the physical layer between the mobile station and the RAN has been replaced by a UMTS physical layer 401, the BSSGP layer between the RAN and the SGSN has been replaced by a corresponding UMTS layer preliminarily known as the RANGP (RAN GPRS Protocol) layer 402, and the MAC, RLC, SNDCP, Network Service and L1bis layers have been adapted according to the guidelines given above in association with FIG. 3.

Next we will describe some handover situations where a mobile station and the network will apply the principle of temporarily suspending error-critical communications according to the invention. FIG. 5a illustrates a situation where the mobile station 501 has a macrodiversity connection with two RNCs (Radio Network Controllers) network so that the first RNC 502 is the so-called serving RNC and the second RNC 503 is the so-called drifting RNC. The interface between the two RNCs is called the Iur interface. From the serving RNC 502 there is a connection to a SGSN 504 over a so-called Iu interface, and from the SGSN there is a connection to a GGSN 505. A generalisation of the arrangement of FIG. 5a is the case where the second RNC is just a "new" serving RNC regardless of whether it was firstly a drifting RNC or not. Drifting RNCs relate only to macrodiversity; if no macro-diversity is applied there will be an "old" serving RNC and a "new" serving RNC (or, in second generation systems, an "old" BSS and a "new" BSS) with little simultaneous service from both of them to the mobile station.

In FIG. 5b either the mobile station 501 or some network device in the radio access network (not shown) where the serving RNC 502 is located notices that the direct connection between the mobile station and the serving RNC is critically weakening or has been severed, so a handover to the second RNC 503 is inevitable. According to the invention, the handover is started by requesting all such active services to be suspended which require a high level of correctness and tolerate long delays. In a GPRS type arrangement the suspension of services would require suspending whole PDP contexts, because the PDP context can only have one QoS. In a UMTS type arrangement it suffices to suspends those QoS flows for which the QoS allows for (delay tolerance) and even requires (correctness) the suspension. To retain generality we will use the word "service" for the entities that will be suspended. It will be most advantageous to define beforehand, in a standardised specification, a threshold value either for required correctness or for allowed delays or for both so that only those active services will be suspended for which the required correctness or allowed delay or both exceed the threshold value(s).

After the suspension of the selected active services the network will establish a new connection over the Iu interface between the second RNC 503 and the SGSN 504. Simultaneously communication on the non-suspended services may continue. Typically there will be some RLC level buffers in at least one of the devices taking part in the communication that need to be emptied before the second RNC may be designated as the serving RNC. The situation illustrated in FIG. 5*c* may only become relevant after all such RLC buffers have been emptied and the new connection over the Iu interface between the second RNC and the SGSN has been established. At that moment the suspended services may be released so that communication over them will continue normally. In FIG. 5*c* the second RNC 503 is the serving RNC and the old connection over the Iu interface between the first RNC 502 and the SGSN 504 has been terminated.

In FIG. 5*c* it has been assumed that the handover was not associated with a complete severance of the direct connections between the mobile station 501 and the first RNC 502. Consequently the connection over the Iur interface between the RNCs is not terminated and the first RNC continues to operate as a drifting RNC. Sooner or later, especially if the mobile station continues the movement that caused the direct connections to the first RNC to weaken, these direct connections will fall under the level of acceptable quality so that they are completely released and the connection over the Iur interface between the RNCs is terminated.

FIGS. 6*a* to 6*c* describe a handover situation where the new RNC operates under a new SGSN. Such a handover is called an inter-RNC, inter-SGSN handover. Here we have expected that an Iur interface exists even between RNCs that operate under different SGSNs; this is not a requirement associated with the invention, because the invention works equally well without any connections between the RNCs. FIG. 6*a* corresponds to FIG. 5*a* with the sole exception that the second RNC 601 belongs to the domain of a second SGSN 602. At some stage it is again noticed that a handover from the first RNC to the second RNC will be required. The operation starts with the suspension of error-critical, delay-tolerant PDP contexts as described above. According to FIG. 6*b*, the controlling responsibility remains in the first RNC 502 and the first SGSN 504 during the time it takes the mobile station to registrate under the second SGSN 602 and the latter to set up a new GTP bearer with the GGSN 505. The first SGSN 504 will also transmit all information related to the connections to be transferred to the second SGSN 602, as illustrated by an arrow in FIG. 6*b*. Thereafter the controlling responsibilities may be moved to the second RNC 601 and the second SGSN 602 as illustrated in FIG. 6*c*, and the suspended PDP contexts may be resumed. If there are still usable direct connections between the mobile station and the first RNC 502 and a working Iur interface between the RNCs, the first RNC may remain as a drifting RNC.

It is possible that the new SGSN is not capable of handling some information flows the controlling responsibility of which it has received during the handover. Special measures which are as such outside the scope of the present invention may be taken in order to adapt the information flows to the capabilities of the new SGSN. After all information flows are in such shape that the new SGSN is capable of handling them, the connection between the mobile terminal and the old SGSN may be terminated.

Figure 7B:
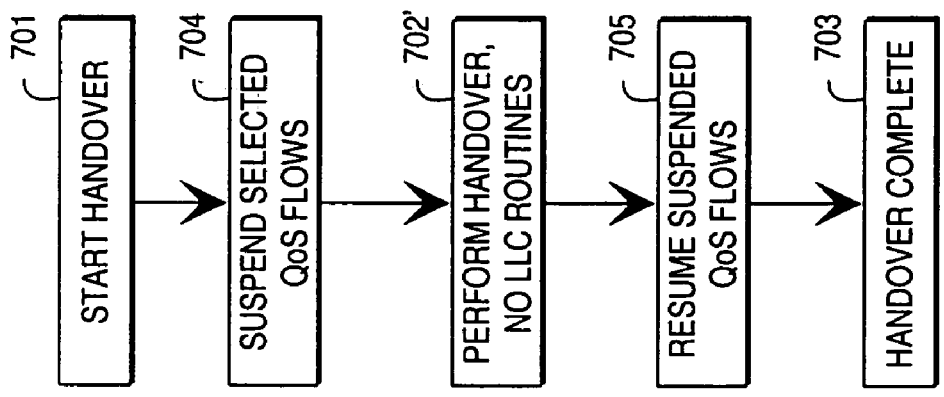
FIGS. 7a and 7b show a comparison between a prior art method and a method according to the invention.
Figure 7A:
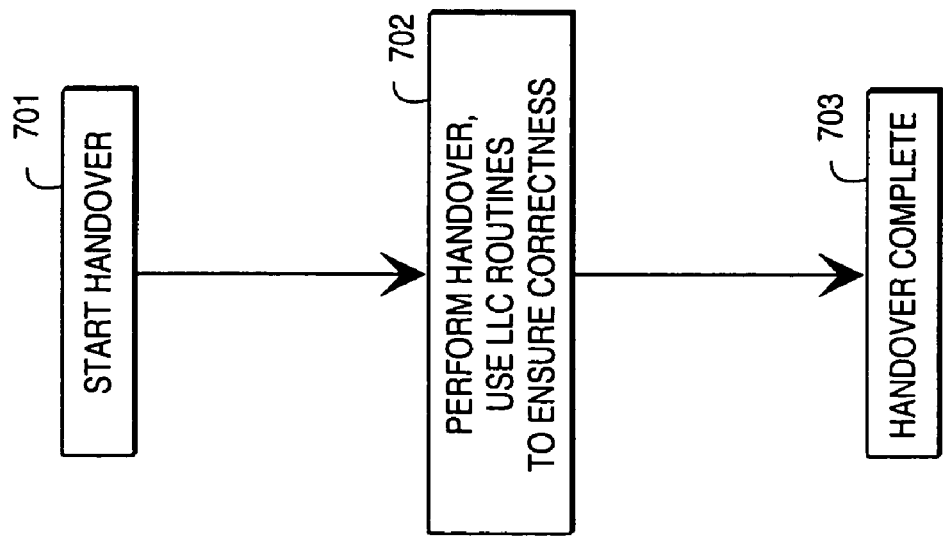

FIGS. 7*a* and 7*b* are simplified flow diagrams that show an important difference between a prior art method (FIG. 7*a*) and a method according to the invention (FIG. 7*b*) when handovers are concerned. In FIG. 7*a* all QoS flows are active throughout the handover, and LLC layer routines are employed to correct any errors that the handover causes to the error-critical, delay-tolerant QoS flows. In FIG. 7*b* a step 704 of suspending the selected error-critical, delay-tolerant QoS flows precedes the handover, no LLC layer routines are performed, and a step 705 of resuming the error-critical, delay-tolerant QoS flows follows the handover.

A comparison between FIGS. 1 and 4, with the help of FIGS. 2 and 3, may be used to describe a mobile station and an SGSN according to the invention. It is known as such that the advantageous implementation of the protocol stacks in mobile stations and SGSNs is in the form of microprocessor-executable computer programs stored in memory devices. By applying the teachings of the present patent application it is within the capabilities of a person skilled in the art to realise, instead of the protocol structures illustrated in FIGS. 1 and 2, the protocol structures according to FIGS. 3 and 4 so that the mobile stations and SGSNs with such an implementation will operate according to the present invention.

The invention has been desribed above solely with reference to packet-switched non-real time communication connections. However, it is possible to apply the concept of suspending and releasing also to specific kinds of circuit-switched connections. The prerequisite for applying the invention to circuit-switched connections is that such connections must have very relaxed delay requirements; in the terminology of second generation digital cellular radio systems the invention is applicable to non-transparent circuit-switched connections but not to transparent circuit-switched connections because of the tight delay requirements associated therewith.

The invention claimed is:

1. A method for a mobile station for performing a handover from a first network connection to a second network connection in a mobile telecommunication system providing for non-real time telecommunication connections over a radio interface between mobile stations and the fixed parts of the mobile telecommunication system, comprising in the order recited the steps of:

suspending at least one active packet-switched non-real time telecommunication connection between a mobile station and the fixed parts of the mobile telecommunication system, performing a handover from the first network connection to the second network connection, including exhausting through the first network connection all transmission buffers that, at the time of suspending said at least one active packet-switched non-real time telecommunication connection, contain data to be transmitted over the first network connection, and resuming the suspended non-real time telecommunication connection.

2. A method according to claim 1, wherein the first network connection is a connection from the mobile station via a first radio network controller to a first serving node of a packet-switched data transmission network and the second network connection is a connection from the mobile station via a second radio network controller to said first serving node, whereby the step of performing a handover comprises the substep of establishing the logical connections between the mobile station and said first serving node via said second radio network controller that constitute the second network connection.

3. A method according to claim 2, wherein the first network connection is a macrodiversity connection comprising a direct connection between the mobile station and said first radio network controller and an indirect connection between the mobile station and the said first radio network controller via said second radio network controller and the second network connection is a macrodiversity connection comprising a direct connection between the mobile station and said second radio network controller and an indirect connection between the mobile station and said second radio network controller via said first radio network controller, whereby the step of performing a handover comprises additionally the substep of changing the macrodiversity control from the first radio network controller to the second radio network controller.

4. A method according to claim 1, wherein the first network connection is a connection from the mobile station via a first radio network controller to a first serving node of a packet-switched data transmission network and the second network connection is a connection from the mobile station via a second radio network controller to a second serving node of said packet-switched data transmission network, whereby the step of performing a handover comprises the substep of establishing the logical connections between the mobile station and said first serving node via said second radio network controller that constitute the second network connection.

5. A method according to claim 1, wherein the non-real time telecommunication connections are arranged according to a certain structure of protocol stacks in a mobile station, a radio access network, a serving support mode of a packet-switched data transfer network and a gateway support mode of a packet-switched data transfer network, and the method comprises the steps of communicating between a number of first peer entities between the mobile station and the radio access network, wherein said first peer entities are composed of a physical layer, a Media Access Control layer and a Radio Link Control layer, communicating between a number of second peer entities between the radio access network and the serving support node of a packet-switched data transfer network, wherein said second peer entities are composed of a physical layer, a Network Service layer and a protocol layer for communication between the radio access network and the packet-switched data transfer network, and communicating between a number of third peer entities between the mobile station and the serving support node of a packet-switched data transfer network, wherein said third peer entities are composed of a Subnetwork Dependent Control Protocol Layer which in the mobile station is immediately on top of the Radio Link Control layer and in the serving support node of a packet-switched data transfer network is immediately on top of the protocol layer for communication between the radio access-network and the packet-switched data transfer network.

6. A method according to claim 5, additionally comprising the steps of performing error detection and error-related retransmission as well as flow control between the mobile station and the radio access network in said Radio Link Control layer.

7. A method according to claim 1, wherein the first network connection and the second network connection are packet-switched connections for transmitting error-critical data.

8. A method according to claim 1, wherein the first network connection and the second network connection are non-transparent circuit-switched connections.

9. A mobile station for communicating with the fixed parts if a mobile telecommunication system over network connections, comprising means for executing the method according to claim 1 in order to perform a handover from a first network connection to a second network connection.

10. A method for a mobile station for performing a handover from a first network connection to a second network connection in a mobile telecommunication system providing for non-real time telecommunication connections over a radio interface between mobile stations and the fixed parts of the mobile telecommunication system, comprising in the order recited the steps of:

suspending at least one active non-real time telecommunication connection between a mobile station and the fixed parts of the mobile telecommunication system, performing a handover from the first network connection to the second network connection, and resuming the suspended non-real time telecommunication connection;

wherein the first network connection is a connection from the mobile station via a first radio network controller to a first serving node of a packet-switched data transmission network and the second network connection is a connection from the mobile station via a second radio network controller to said first serving node, whereby the step of performing a handover comprises the substeps of:

exhausting through the first network connection all transmission buffers that, at the time of suspending said at least one active non-real time telecommunication connection, contain data to be transmitted over the first network connection; and establishing the logical connections between the mobile station and said first serving node via said second radio network controller that constitute the second network connection.

11. A method according to claim 10, wherein:

the first network connection is a macrodiversity connection comprising a direct connection between the mobile station and said first radio network controller and an indirect connection between the mobile station and said first radio network controller via said second radio network controller; and the second network connection is a macrodiversity connection comprising a direct connection between the mobile station and said second radio network controller and an indirect connection between the mobile station and said second radio network controller via said first radio network controller, whereby the step of performing a handover comprises additionally the substep of changing the macrodiversity control from the first radio network controller to the second radio network controller.

12. A method according to claim 10, wherein the first network connection is a connection from the mobile station via a first radio network controller to a first serving node of a packet-switched data transmission network and the second network connection is a connection from the mobile station via a second radio network controller to a second serving node of said packet-switched data transmission network, whereby the step of performing a handover comprises the substeps of:

exhausting through the first network connection all transmission buffers that, at the time of suspending said at least one active non-real time telecommunication connection, contain data to be transmitted over the first network connection; and establishing the logical connections between the mobile station and said second serving node via said second radio network controller that constitute the second network connection.

13. A method according to claim 10, wherein the non-real time telecommunication connections are arranged according to a certain structure of protocol stacks in a mobile station, a radio access network, a serving support node of a packet-switched data transfer network and a gateway support node of a packet-switched data transfer network, and the method comprises the steps of:

communicating between a number of first peer entities between the mobile station and the radio access network, wherein said first peer entities are composed of a physical layer, a Media Access Control layer and a Radio Link Control layer, communicating between a number of second peer entities between the radio access network and the serving support node of a packet-switched data transfer network, wherein said second peer entities are composed of a physical layer, a Network Service layer and a protocol layer for communication between the radio access network and the packet-switched data transfer network, and communicating between a number of third peer entities between the mobile station and the serving support node of a packet-switched data transfer network, wherein said third peer entities are composed of a Subnetwork Dependent Control Protocol Layer which in the mobile station is immediately on top of the Radio Link Control layer and in the serving support node of a packet-switched data transfer network is immediately on top of the protocol layer for communication between the radio access network and the packet-switched data transfer network.

14. A method according to claim 13, additionally comprising the steps of performing error detection and error-related retransmission as well as flow control between the mobile station and the radio access network on said Radio Link Control layer.

15. A method according to claim 10, wherein the first network connection and the second network connection are packet-switched connections for transmitting error-critical data.

16. A method according to claim 10, wherein the first network connection and the second network connection are non-transparent curcuit-switched connections.

17. A mobile station for communicating with the fixed parts of a mobile telecommunication system over network connections, comprising means for executing the method according to claim 10 in order to perform a handover from a first network connection to a second network connection.

18. A method for a mobile station for performing a handover from a first network connection to a second network connection in a mobile telecommunication system providing for non-real time telecommunication connections over a radio interface between mobile stations and the fixed parts of the mobile telecommunication system, comprising in the order recited the steps of:

suspending at least one active non-real time telecommunication connection between a mobile station and the fixed parts of the mobile telecommunication system, performing a handover from the first network connection to the second network connection, and resuming the suspended non-real time telecommunication connection;

wherein the first network connection is a connection from the mobile station via a first radio network controller to a first serving node of a packet-switched data transmission network and the second network connection is a connection from the mobile station via a second radio network controller to a second serving node of said packet-switched data transmission network, whereby the step of performing a handover comprises the substeps of:

exhausting through the first network connection all transmission buffers that, at the time of suspending said at least one active non-real time telecommunication connection, contain data to be transmitted over the first network connection; and establishing the logical connections between the mobile station and said second serving node via said second radio network controller that constitute the second network connection.

19. A method according to claim 18, wherein the non-real time telecommunication connections are arranged according to a certain structure of protocol stacks in a mobile station, a radio access network, a serving support node of a packet-switched data transfer network and a gateway support node of a packet-switched data transfer network, and the method comprises the steps of:

communicating between a number of first peer entities between the mobile station and the radio access network, wherein said first peer entities are composed of a physical layer, a Media Access Control layer and a Radio Link Control layer, communicating between a number of second peer entities between the radio access network and the serving support node of a packet-switched data transfer network, wherein said second peer entities are composed of a physical layer, a Network Service layer and a protocol layer for communicating between the radio access network and the packet-switched data transfer network, and communicating between a number of third peer entities between the mobile station and the serving support node of a packet-switched data transfer network, wherein said third peer entities are composed of a Subnetwork Dependent Control Protocol Layer which in the mobile station is immediately on top of the Radio Link Control layer and in the serving support node of a packet-switched data transfer network is immediately on top of the protocol layer for communication between the radio access network and the packet-switched data transfer network.

20. A method according to claim 19, additionally comprising the steps of performing error detection and error-related retransmission as well as flow control between the mobile station and the radio access network on said Radio Link Control layer.

21. A method according to claim 18 wherein the first network connection and the second network connection are packet-switched connections for transmitting error-critical data.

22. A method according to claim 18, wherein the first network connection and the second network connection are non-transparent circuit-switched connections.

23. A mobile station for communicating with the fixed parts of a mobile telecommunication system over network connections, comprising means for executing the method according to claim 18 in order to perform a handover from a first network connection to a second network connection.

* * * * *